United States Patent
Uyeki (10) Patent No.: US 9,000,722 B2
(45) Date of Patent: Apr. 7, 2015

(54) ELECTRIC VEHICLE CHARGING STRATEGY

(75) Inventor: Robert Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 731 days.

(21) Appl. No.: 13/175,720

(22) Filed: Jul. 1, 2011

(65) Prior Publication Data

US 2013/0002188 A1 Jan. 3, 2013

(51) Int. Cl.
- *H02J 7/00* (2006.01)
- *H02J 7/14* (2006.01)
- *H01M 10/44* (2006.01)
- *B60L 11/18* (2006.01)
- *H01M 10/48* (2006.01)
- *H02J 3/14* (2006.01)
- *H02J 13/00* (2006.01)

(52) U.S. Cl.
CPC ........... *H01M 10/44* (2013.01); *B60L 11/1824* (2013.01); *B60L 11/1838* (2013.01); *H01M 10/48* (2013.01); *H02J 3/14* (2013.01); *H02J 7/0027* (2013.01); *H02J 13/0075* (2013.01); *H02J 2003/146* (2013.01); *Y02T 10/7088* (2013.01); *Y02T 10/7005* (2013.01); *Y02T 90/16* (2013.01); *Y02T 90/168* (2013.01); *Y02T 90/121* (2013.01); *Y02T 90/14* (2013.01); *Y02T 10/7055* (2013.01); *Y04S 30/12* (2013.01); *B60L 11/1816* (2013.01); *B60L 2240/70* (2013.01); *Y02T 10/7291* (2013.01)

(58) Field of Classification Search
CPC ............ B60L 11/1824; B60L 11/1811; B60L 11/1809; B60L 11/182; B60L 11/1822; B60L 11/1838; B60L 2230/00; B60L 2230/10; B60L 2230/16; B60L 240/72

USPC ......... 320/109, 104, 137, 140, 101, 155, 156; 307/10.1

See application file for complete search history.

(56) References Cited

U.S. PATENT DOCUMENTS

| | | | |
|---|---|---|---|
| 7,590,472 B2 * | 9/2009 | Hakim et al. | 700/295 |
| 7,782,021 B2 | 8/2010 | Kelty et al. | |
| 7,792,613 B2 | 9/2010 | Kressner et al. | |
| 7,956,570 B2 | 6/2011 | Lowenthal et al. | |
| 8,509,976 B2 * | 8/2013 | Kempton | 701/22 |
| 2007/0271006 A1 * | 11/2007 | Golden et al. | 700/295 |
| 2008/0052145 A1 * | 2/2008 | Kaplan et al. | 705/8 |
| 2008/0312782 A1 | 12/2008 | Berdichevsky et al. | |

(Continued)

FOREIGN PATENT DOCUMENTS

WO    WO 2010/100081 A2    9/2010

OTHER PUBLICATIONS

General Motors, "Volt Mobile App," one page. [Online] [Retrieved Jun. 13, 2011] Retrieved from the Internet <URL:http://www.chevrolet.com/volt.>.

(Continued)

*Primary Examiner* — Edward Tso
*Assistant Examiner* — Alexis A Boateng
(74) *Attorney, Agent, or Firm* — Fenwick & West LLP (57) ABSTRACT

The charging of an electric vehicle connected to a charging station is initiated. When a state of charge of the vehicle reaches a minimum state of charge, the charging is halted. The minimum state of charge is less than the full charge capacity of the vehicle. A time for reinitiating the charging is determined. The charging of the vehicle is reinitiated at the determined time.

7 Claims, 7 Drawing Sheets

(56) References Cited

U.S. PATENT DOCUMENTS

| | | |
|---|---|---|
| 2009/0079388 A1* | 3/2009 | Reddy ............................ 320/109 |
| 2009/0082957 A1 | 3/2009 | Agassi et al. |
| 2009/0259603 A1 | 10/2009 | Housh et al. |
| 2009/0313098 A1* | 12/2009 | Hafner et al. ................ 705/14.1 |
| 2010/0012406 A1 | 1/2010 | Kressner et al. |
| 2010/0274690 A1 | 10/2010 | Tate |
| 2010/0280675 A1* | 11/2010 | Tate et al. ..................... 700/295 |
| 2011/0047102 A1 | 2/2011 | Grider et al. |
| 2011/0153131 A1* | 6/2011 | Kressner et al. ................ 701/22 |
| 2011/0175569 A1* | 7/2011 | Austin ........................... 320/109 |
| 2011/0202418 A1* | 8/2011 | Kempton et al. ............ 705/26.1 |
| 2011/0238341 A1* | 9/2011 | Etezadi-Amoli et al. ....... 702/61 |
| 2012/0089408 A1* | 4/2012 | Stancil et al. .................. 705/1.1 |

OTHER PUBLICATIONS

Nissan Motor Co. Ltd., "answers: charging," one page. [Online] [Retrieved Jun. 13, 2011] Retrieved from the Internet <URL: http://www.nissanusa.com/leaf-electric-car/faq/list/charging#/leaf-electric-car/faq/list/charging.>.

Patent Cooperation Treaty, International Search Report and Written Opinion, International Patent Application No. PCT/US2012/038724, Oct. 26, 2012, 16 Pages.

* cited by examiner

ELECTRIC VEHICLE CHARGING STRATEGY

FIELD OF THE EMBODIMENTS

The embodiments generally relate to electric vehicles and more particularly to charging electric vehicles.

BACKGROUND

An electric vehicle uses one or more electric motors for propulsion of the vehicle. The electric motors are powered by rechargeable batteries on-board the vehicle. A driver of an electric vehicle typically recharges the batteries of his vehicle at home by connecting the vehicle to a charging station that transfers electric energy to the vehicle. A utility company supplies the electric energy to the charging station and charges the driver for the electric energy.

Utility companies charge different rates for electric energy consumed based on the time, day, month, and/or calendar season when it is consumed. Typically, a utility company charges its lowest rates in the early morning and late at night. Those time periods are often referred to as off-peak hours because that is when overall energy consumption is low. An electric vehicle may be set to only charge during off-peak hours in order to save the owner money. However, such a setting may be a major inconvenience and potentially dangerous because it can cause a driver to be stranded. Assume, for example, that a driver of an electric vehicle arrives home at 6 PM with little or no charge left in the batteries of the vehicle, that the vehicle is set to charge during off-peak hours (e.g., after 10 PM), and it is the only vehicle that the driver's family owns. If there is an emergency at 8 PM and the driver has to rush, for example, to a hospital, the driver will be stranded because the vehicle was not charging between 6 and 8 PM.

Thus, there is a need for a way to be able to charge an electric vehicle in a way that takes advantage of economic electric energy rates offered by utility companies but at the same time prevents a driver from becoming stranded.

SUMMARY

The embodiments herein describe the charging of an electric vehicle connected to a charging station. The charging of the vehicle is initiated. When a state of charge of the vehicle reaches a minimum state of charge, the charging is halted. The minimum state of charge is less than the full charge capacity of the vehicle. A time for reinitiating the charging is determined. In one embodiment, the determined time is a time when electric energy is economical. In another embodiment, the determined time is a time when electric energy is generated using a renewable energy source. The charging of the vehicle is reinitiated at the determined time.

In one embodiment, a tracking server tracks a plurality of electric vehicles charging in a sector. Each of the plurality of vehicles being tracked is connected to a charging station and charging according to a charging determined by the vehicle. When the total electric energy consumption of the sector is above a threshold, the tracking server determines a strategy for charging the plurality of vehicles that will reduce the electric energy consumption. The tracking server transmits to one or more of the vehicles instruction for charging based on the strategy determined by the server. A vehicle receiving the instructions charges according to the instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the present subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An embodiment is now described with reference to the figures where like reference numbers indicate identical or functionally similar elements. In the figures, the left most digits of each reference number correspond to the figure in which the reference number is first used. Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

The embodiments also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments, and any references below to specific languages are provided for enablement and best mode of the embodiments.

In addition, the language used in the specification has been principally selected for readability and instructional purposes, and may not have been selected to delineate or circumscribe the inventive subject matter. Accordingly, the embodiments are intended to be illustrative, but not limiting, of the scope of the embodiments, which is set forth in the claims.

Figure 1:
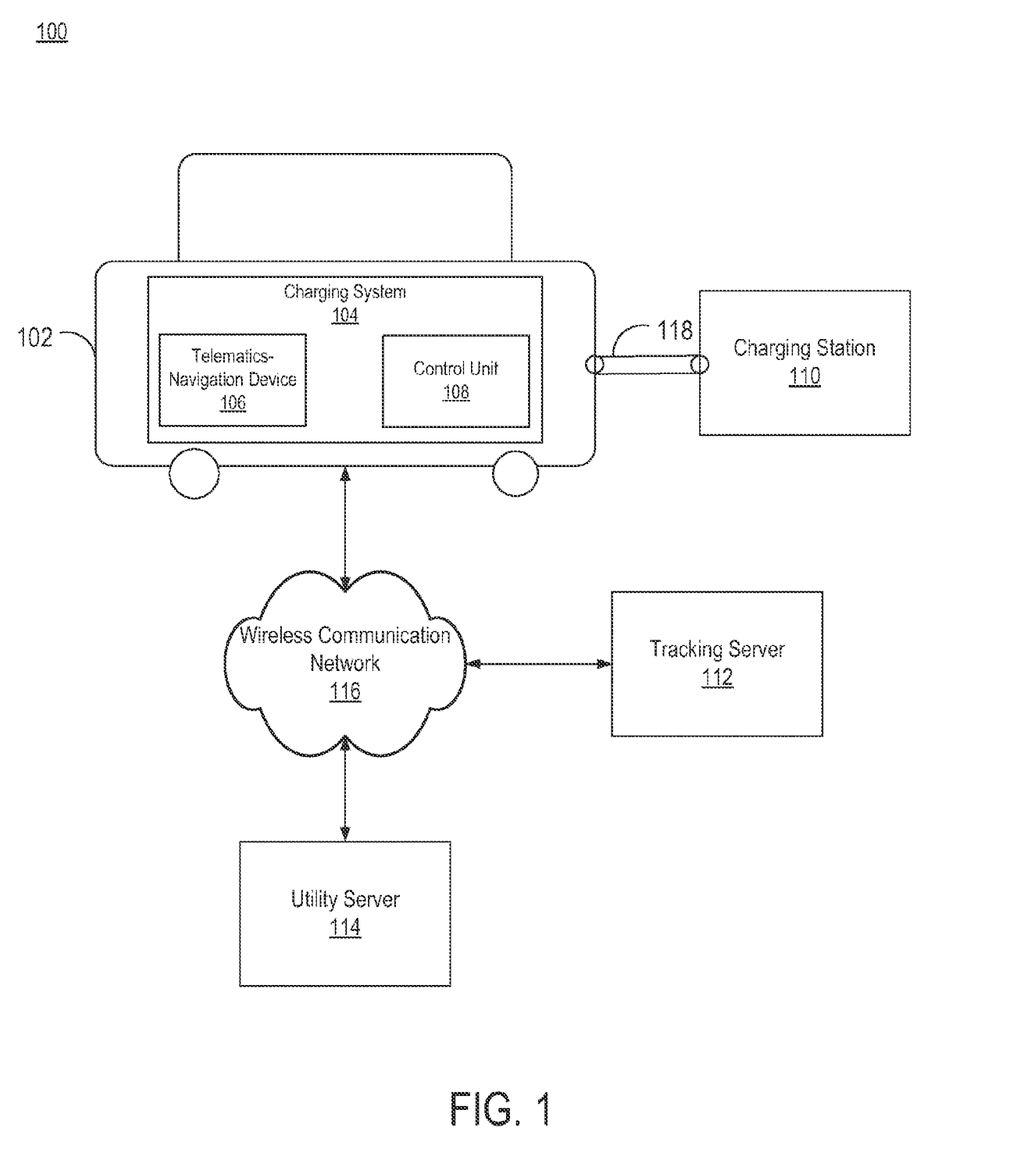
FIG. 1 is a high-level block diagram of a vehicle communication environment according to one embodiment.

FIG. 1 is a high-level block diagram of a vehicle communication environment 100 according to one embodiment. FIG. 1 illustrates an electric vehicle (EV) 102, a tracking server 112, and a utility server 114 connected by a wireless communication network 116.

The EV 102 represents a vehicle that contains one or more electric motors for propulsion of the vehicle 102. In one embodiment, the EV 102 is purely electric in that it is only propelled by one or more electric motors. In another embodiment, the EV 102 has one or more electric motors and one or more internal combustion engines for propelling the EV 102 (e.g., a plug-in hybrid electric vehicle).

The one or more electric motors of the EV 102 are powered by rechargeable batteries on-board the vehicle 102. The on-board batteries are charged when the EV 102 is connected to a charging station. As illustrated in FIG. 1, in this embodiment, the EV 102 is connected to a charging station 110 via a charging cable 118. The charging station 110 is a device that provides electric energy to an EV (i.e., charges the batteries of the EV). The electric energy is supplied to the charging station 110 by a utility company through an electrical grid. In one embodiment, the charging station 110 is connected to a 220/240 volt dedicated circuit. In one embodiment, the charging station 110 is located at the home of the EV's owner. In one embodiment, the on-board batteries are also charged using regenerative braking The EV 102 includes a charging system 104 that manages the charging of the EV 102. The charging system 104 includes a telematics-navigation device 106 and a control unit 108. The telematics-navigation device 106 represents a device that exchanges information with users of the telematics-navigation device 106 and entities connected to the wireless communication network 116. The telematics-navigation device 106 receives instructions from a user of the telematics-navigation device 106 as to a mode for charging the EV 102 when the EV 102 is connected to a charging station. There are multiples modes under which the EV 102 can be charged. Under each mode, the EV 102 is charged according to a different strategy. The telematics-navigation device 106 also communicates with the utility server 114 to obtain information on electric energy, such as the cost of the electric energy and whether the energy was generated using a renewable energy source (e.g., sunlight, wind or tides). Additionally, when the EV 102 is connected to a charging station and is being charged, the telematics-navigation device 106 provides charging information to the tracking server 112.

The control unit 108 controls the charging of the EV 102 when the EV 102 is connected to a charging station. What is meant herein by charging the EV 102 is the charging of the EV's rechargeable batteries. When the EV 102 is connected to a charging station, the control unit 108 determines a strategy for charging the EV 102 based on a charging mode selected by a user. The control until 108 charges the EV according to the determined strategy.

In one embodiment, a charging mode that may be selected by a user is "economic" mode. In one embodiment, when the EV 102 is connected to a charging station, under the strategy determined by the EV 102 for economic mode, the control unit 108 initiates the charging of the EV 102 by allowing electric energy to flow to the EV 102 from the charging station. The control unit 108 initiates the charging regardless of the current cost of electric energy. The control unit 108 allows the EV 102 to charge until the state of charge of the EV 102 reaches a minimum state of charge. As used herein, the term "state of charge" refers to the amount of electric charge/energy stored in the EV's batteries. Once the minimum state of charge is reached, the control unit 108 halts the charging of the EV 102 (i.e., stops the flow of electric energy from the charging station to the EV 102). The control unit 108 reinitiates the charging of the EV 102 when the cost of electric energy is economical, such as during off-peak times.

The minimum state of charge is typically enough energy to allow a driver to drive in case of an emergency or to run an errand in the EV 102 and return home. The minimum state of charge may be enough, for example, to go to a nearby grocery store or hospital and return home. One benefit of the economic mode is that it allows the EV 102 to receive some charge to prevent a driver from being stranded while at the same time allowing most of the charging to occur when electric energy is economical.

Another charging mode that may be selected by a user is "green" mode. Green mode is similar to economic mode except that the control unit 108 reinitiates the charging of the EV 102 when electric energy provided to the charging station is being generated using a renewable energy source.

The tracking server 112 helps reduce electric energy consumption in different sectors. A sector is an area of land that may include EVs, homes, businesses, and other entities that consume electric energy from an electrical grid. In one embodiment, a utility company divides a city into sectors and provides geographic coordinates of each sector to the tracking server 112 and as well as an identifier for each sector. In one embodiment, one or more cities form a sector. When electric energy consumption in a sector exceeds a maximum electric energy capacity of the sector, blackouts or brownouts occur in the sector. The tracking server 112 helps avoid blackouts/brownouts, by limiting charging of EVs when necessary.

When an EV is connected to a charging station and charging, the EV transmits to the tracking server 112 charging information. Based on the charging information, the tracking server 112 determines the sector where the EV is being charged. The tracking server 112 monitors the EVs charging in the area. Additionally, the tracking server 112 monitors the total electric energy consumption of the sector.

If the electric energy consumption of the sector is above a threshold, the tracking server 112 determines a strategy to reduce the electric energy consumption of the sector, while if possible continuing to charge one or more of the EVs in the sector. Based on the determined strategy, the tracking server 112 transmits instructions to EVs charging in the sector. An EV receiving the instructions charges according to the instructions instead of continuing to charge according to a strategy determined by the EV based on a charging mode selected by a user. The instructions may be, for example, for the EV to reduce the charging rate or to completely stop charging.

In one embodiment, the tracking server 112 receives information and controls the charging of EVs whose owners have signed up for a program. Under the program, the tracking server 112 is allowed to control the charging of the EVs when necessary in order to avoid blackouts/brownouts. In return for an owner signing up for the program, the owner receives discounted rates for electric energy used to charge his EV.

In one embodiment, the tracking server 112 is maintained by a car manufacturer. In this embodiment, the tracking server 112 only receives information and controls the charging of EVs produced by the car manufacturer. In one embodiment, the car manufacturer is Honda Motor Company. A benefit of the car manufacturer maintaining the tracking server 112 is that the information received from EVs can be maintained confidential and that information is not provided to other entities, such as a utility company.

The utility server 114 provides information about electric energy to different entities. In one embodiment, upon request from the EV 102, the utility server 114 transmits to the EV 102 information about electric energy supplied by a utility company. In one embodiment, information transmitted by the utility server 114 to the EV 102 upon request includes time periods when the electric energy provided by the utility company is generated using a renewable energy source. A renewable energy source is an energy source that is continually replenished, such as sunlight, wind, and tides.

In one embodiment, information transmitted to the EV 102 includes cost information for the electric energy. In one embodiment, the cost information is time of use (TOU) rates where the rates for electric energy vary based on time, day, month, and/or season. For example, the cost information for electric energy during summer months may be $0.14 per KWh during peak hours (e.g., 12 PM to 7 PM), $0.07 per KWh during part-peak hours (e.g., 10 AM to 12 PM and 7 PM to 10 PM), and $0.03 per KWh during non-peak hours (e.g., 12:00 AM to 10 AM and 10 PM to 11:59 PM).

In one embodiment, the utility company offers special rates to the owner of the EV 102 for owning an EV and/or for allowing the tracking server 112 to control the EV's charging. Therefore, in this embodiment, a request from the EV 102 received by the utility server 114 includes indentifying information of the EV 102 (e.g., vehicle identification number (VIN) of the EV 102) and/or identifying information of the owner (e.g., owner's name or address) so that the utility server 114 provides accurate cost information to the EV 102.

In one embodiment, the utility server 114 receives requests from the tracking server 112 for total electric energy consumption of sectors. For a requested sector, the utility server 114 transmits to the tracking server 112 the current total electric energy consumption of the sector. The total electric energy consumption of a sector is the total electric energy provided by a utility company that is being consumed by entities in the sector. Entities may include charging stations, homes, and businesses. In one embodiment, the utility server 114 also transmits information on the total electric energy consumption of a sector to the EV 102.

In one embodiment, the utility server 114 is maintained by a utility company. In another embodiment, the utility server 114 is maintained by a third-party that obtains information from one or more utility companies.

The wireless communication network 116 represents a communication pathway between the EV 102, the tracking server 112, and the utility server 114. In one embodiment, the wireless communication network 116 is a cellular network comprised of multiple base stations, controllers, and a core network that typically includes multiple switching entities and gateways. In one embodiment, the wireless communication network 116 is a wireless local area network (WLAN) that provides wireless communication over a limited area. In one embodiment, the WLAN includes an access point that connects the WLAN to the Internet.

Figure 2:
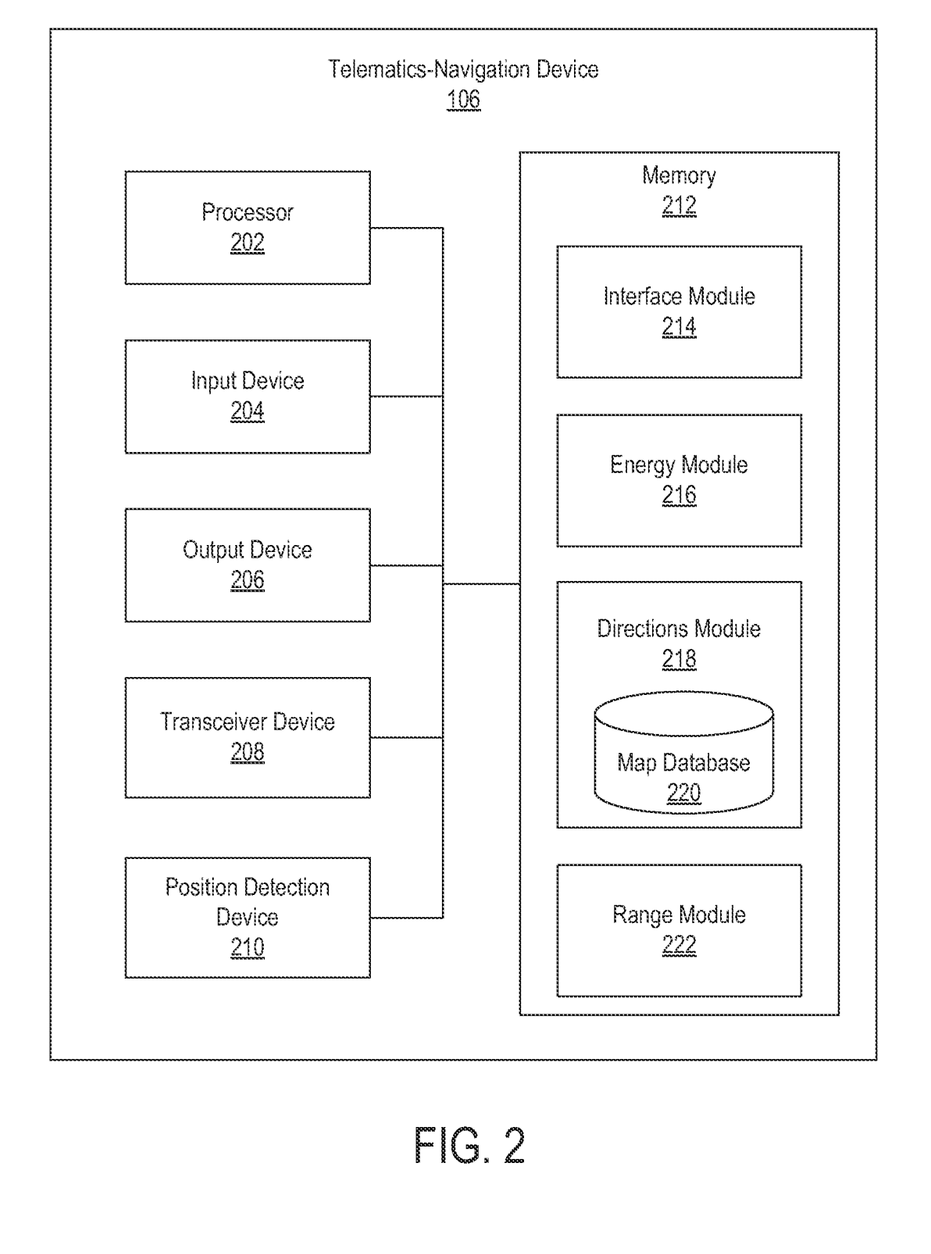
FIG. 2 is a high-level block diagram illustrating a detailed view of a telematics-navigation device according to one embodiment.

FIG. 2 is a high-level block diagram illustrating a detailed view of the telematics-navigation device 106 according to one embodiment. The telematics-navigation device 106 includes a processor 202, an input device 204, an output device 206, a transceiver device 208, a position detection device 210, and a memory 212.

The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 202 comprises an arithmetic logic unit, a microprocessor, a general purpose computer, or some other information appliance equipped to transmit, receive and process electronic data signals from the memory 212, the input device 204, the output device 206, the transceiver device 208, or the position detection device 210.

The input device 204 is any device configured to provide user input to the telematics-navigation device 106 such as, a cursor controller or a keyboard. In one embodiment, the input device 204 can include an alphanumeric input device, such as a QWERTY keyboard, a key pad or representations of such created on a touch screen, adapted to communicate information and/or command selections to processor 202 or memory 212. In another embodiment, the input device 204 is a user input device equipped to communicate positional data as well as command selections to processor 202 such as a joystick, a mouse, a trackball, a stylus, a pen, a touch screen, cursor direction keys or other mechanisms to cause movement adjustment of an image.

The output device 206 represents any device equipped to display electronic images and data as described herein. Output device 206 may be, for example, an organic light emitting diode display (OLED), liquid crystal display (LCD), cathode ray tube (CRT) display, or any other similarly equipped display device, screen or monitor. In one embodiment, output device 206 is equipped with a touch screen in which a touch-sensitive, transparent panel covers the screen of output device 206. In one embodiment, the output device 206 is equipped with a speaker that outputs audio as described herein.

The transceiver device 208 represents a device that allows the telematics-navigation device 106 to communicate with entities connected to the wireless communication network 116. In one embodiment, the telematics-navigation device 106 uses the transceiver device 208 to communicate with the tracking server 112 and the utility server 114.

The position detection device 210 represents a device that communicates with a plurality of positioning satellites (e.g., GPS satellites) to determine the geographical location of the EV 102. In one embodiment, to determine the location of the EV 102, the position detection device 210 searches for and collects GPS information or signals from four or more GPS satellites that are in view of the position detection device 210. Using the time interval between the broadcast time and reception time of each signal, the position detection device 210 calculates the distance between the EV 102 and each of the four or more GPS satellites. These distance measurements, along with the position and time information received in the signals, allow the position detection device 210 to calculate the geographical location of the EV 102.

The memory 212 stores instructions and/or data that may be executed by processor 202. The instructions and/or data may comprise code for performing any and/or all of the techniques described herein. Memory 212 may be a dynamic random access memory (DRAM) device, a static random access memory (SRAM) device, Flash RAM (non-volatile storage), combinations of the above, or some other memory device known in the art. The memory 212 comprises an interface module 214, an energy module 216, a directions module 218, and a range module 222. The modules are adapted to communicate with the processor 202, the input device 204, the output device 206, the transceiver device 208, and/or the position detection device 210.

The interface module 214 communicates with users of the telematics-navigation device 106. The interface module 214 receives from a user (e.g., a driver or passenger of the EV 102) a selection of a mode for charging the EV 102 when the EV 102 is connected to a charging station. The modes that a user can select from may include one or more of the following: "charge now" mode, "timer" mode, "economical" mode, and "green" mode.

Under charge now mode, the EV 102 begins to charge immediately once it is connected to a charging station and continues to charge until the EV 102 is fully charged. Under timer mode, the user provides the interface module 214 with a time to begin charging. At the time provided, the EV 102 begins to charge.

Under economical mode, as discussed above, the EV is charged to a minimum state of charge. Once the minimum state of charge is reached, the charging is halted. In one embodiment, the minimum state of charge is set by the manufacturer of the EV 102 (e.g., 10 percent, 20 percent, enough to drive for 10 miles, 20 miles, 30 miles, 60 miles etc.). In another embodiment, a user provides the interface module 214 with the minimum state of charge. The charging is resumed when electric energy is economical. In one embodiment, economical is when the cost of energy is below peak hour cost (e.g., cost during part-peak and off-peak hours). Peak hours is when there is the highest demand for electric energy on an electrical grid. In one embodiment, economical is the cost of energy during off-peak hours. In one embodiment, a user provides the interface module 214 with a price range for what is considered economical.

Under green mode, the EV 102 is charged to a minimum state of charge and the charging is then halted. The charging is resumed when electric energy supplied to the charging station is generated using a renewable energy source.

In one embodiment, the interface module 214 communicates with a user via the input device 204 and output device 206. In one embodiment, the interface module 214 communicates with a user via a mobile device of the user that is connected to the wireless communication network 116. For example, the mobile device may include an application that allows the user to select the charge mode and provide settings for each mode. The mobile device transmits to the interface module 214 the user's selections and settings.

The energy module 216 obtains information on electric energy from the utility server 114. In one embodiment, the information that the energy module 216 obtains from the utility server 114 includes cost information for electric energy, times when electric energy is generated using a renewable energy source, and information on the total electric energy consumption of one or more sectors. In one embodiment, the cost information obtained by the energy module includes current time of use rates for electric energy.

In one embodiment, the energy module 216 requests electric energy information from the utility server 114 periodically. For example, information may be requested every day, once a month, or once per calendar season. In one embodiment, the energy module 216 requests electric energy information from the utility server 114 every time the EV 102 is connected to a charging station. When the energy module 216 receives electric energy information from the utility server 114, the energy module 216 provides the information to the control unit 108.

The directions module 218 provides a user of the EV 102 with driving directions to a destination. When a request is received from a user for directions to a destination, the directions module 218 obtains from the position detection module 210 the current geographic location of the EV 102. The directions module 218 uses one or more maps stored in a map database 220 to identify routes from the current location of the EV 102 to the destination. In one embodiment, the directions module 218 selects one of the routes based on criteria provided by a user, such as the fastest route, the shortest route, the least congested route, the most energy efficient route, the street dominant route, and the highway dominant route. In another embodiment, the directions module 218 presents the identified routes to the user and allows the user to select one of the routes. The directions module 218 provides directions through the output device 206 on how to get to the destination via the selected route.

The range module 222 determines the driving range of the EV 102. What is meant by the range of the EV 102 is the distance that the EV 102 can travel before it no longer has energy to travel. Periodically or when the range module 222 receives a request from a user for the driving range of the EV 102, the range module 222 identifies the current state of charge of the EV 102. The range module 222 uses the identified state of charge to calculate the range of the EV 102. In one embodiment, the range module 222 calculates the range using a formula that is dependent on the state of charge. In one embodiment, other information in addition to the state of charge may be used to calculate the range such as the weight of the EV 102, the age of the batteries, terrain information about the route currently being traveled on (e.g., whether traveling uphill), the geographic location of the EV 102, weather information (e.g., whether it is raining), and traffic conditions (e.g., amount of congestion on the route). The calculated driving range is presented via the output device and/or transmitted to a mobile device of a user.

In one embodiment, the range module 222 receives requests for a determination as to whether the EV 102 has sufficient charge to reach a destination. When such a request is received, the range module 222 has the directions module 218 identify a route from the current location of the EV 102 to the destination. The range module 222 determines the distance between the current location and the destination on the identified route. The range module 222 determines whether the EV 102 has sufficient energy to reach the destination based at least on the current state of charge of the EV 102 and the determined distance. In one embodiment, other information may be additionally taken into account, such as terrain information, weather information, and traffic conditions. An indication is given to the requesting user as to whether the EV 102 can reach the destination.

Figure 3:
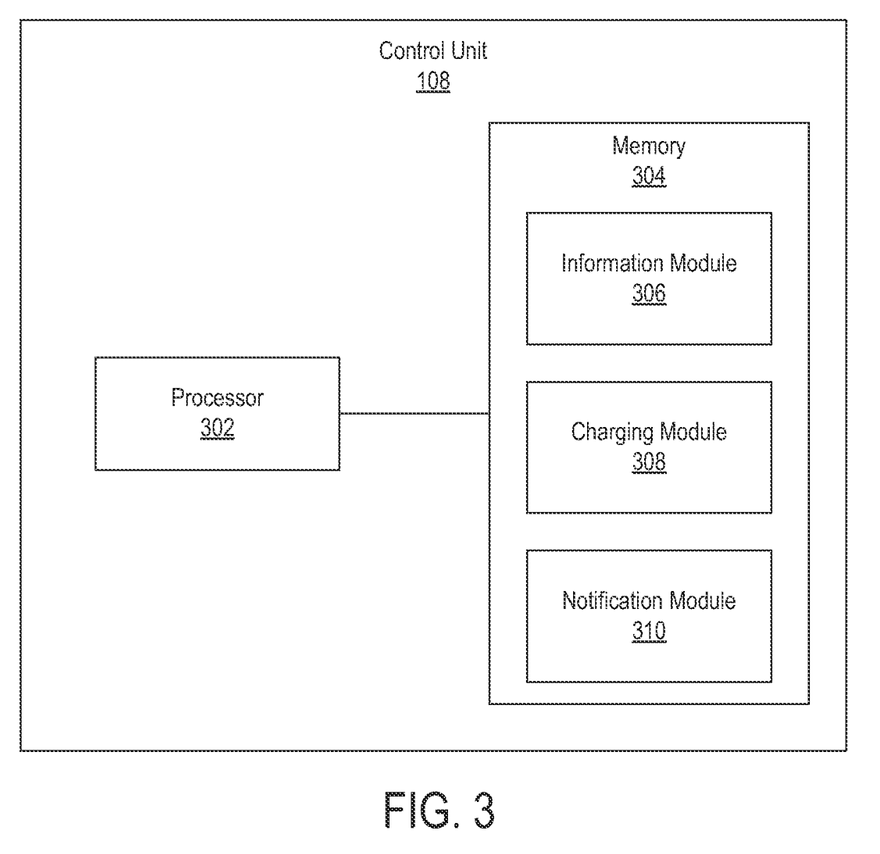
FIG. 3 is a high-level block diagram illustrating a detailed view of a charging unit according to one embodiment.

FIG. 3 is a high-level block diagram illustrating a detailed view of the control unit 108 according to one embodiment. The control unit 108 includes a processor 302 and a memory 304. In one embodiment, the processor 302 and memory 304 are functionally equivalent to the processor 202 and memory 212 of the telematics-navigation device 106. The memory 304 includes an information module 306, a charging module 308, and a notification module 310.

The information module 306 provides charging information to the tracking server 112. In one embodiment, when the EV 102 is connected to a charging station and charging, the information module 306 periodically transmits charging information to the tracking server 102 (e.g., every 15 minutes). In one embodiment, the information module 306 transmits charging information to the tracking server 112 when the EV 102 starts to be charged and when the charging stops. The charging information that may be transmitted to the tracking server 112 by the information module 306 includes one or more of the following: the current time, time when charging started, time when charging stopped, the current geographic location of the EV 102, a VIN of the EV 102, information about the owner of the E.V. (e.g., owner's identifier, name or address), information about the charging station (e.g., voltage at the charging station), the current flow, and the current state of charge of the EV 102.

Charging module 308 manages the charging of the EV 102. When the EV 102 is connected to a charging station via a charging cable, the charging module 308 determines a strategy for charging the EV 102 based on a charging mode selected by a user through the telematics-navigation device 106.

If charge now mode was selected, the strategy determined by the charging module 308 for charging the EV 102 includes the charging module 308 immediately initiating the charging of the EV 102. In one embodiment, to initiate the charging, the charging module 308 simply allows electric energy from the charging station to flow to the EV 102. In another embodiment, the charging cable includes a data connection to the charging station and to initiate charging, the charging module 308 sends a signal to the charging station for it to start transmitting electric energy. Similarly, to stop charging of the EV 102, the charging module 308 transmits a signal to the station for it to stop the transmission of electric energy. Once charging is initiated, the charging module 308 allows the EV 102 to continue charging until the EV 102 is fully charged. The charging module 308 maintains the EV 102 fully charged until the EV 102 is disconnected from the charging station.

If timer mode was selected, the strategy determined by the charging module 308 for charging the EV 102 includes the charging module 308 identifying a set time associated with the timer mode and provided to the telematics-navigation device 106. The charging module 308 tracks the current time. At the set time, the charging module 308 initiates charging of the EV 102. In one embodiment, the charging module 308 allows the EV 102 to continue charging until the EV 102 is fully charged. In another embodiment, if a user provided a stop time to the telematics-navigation device 106, the charging module 308 allows the EV 102 to charge until the stop time is reached or the EV 102 is fully charged, whichever occurs first.

If economical mode was selected, the strategy determined by the charging module 308 for charging the EV 102 includes the charging module 308 determining whether the current state of charge of the EV 102 is less than a minimum state of charge. If the current state of charge is below the minimum state of charge, the charging module 308 initiates the charging of the EV 102 regardless of the current cost of electric energy. The charging module 308 halts the charging of the EV 102 once the state of charge of the EV 102 reaches the minimum state of charge. The minimum state of charge is an amount that is less than the EV 102 being fully charged (i.e., less than EV being at full charge capacity, such as at 10-50% of capacity).

The charging module 308 determines a time for reinitiating the charging based on the latest cost information obtained by telematics-navigation device 106 from the utility server 114. The charging module 308 determines to reinitiate charging at the closest time when the cost of electric energy is economical. The charging module 308 reinitiates charging of the EV 102 at the determined time. The charging module 308 allows the charging of the EV 102 to continue as long as the electric energy being transmitted by the charging station is economical and until the EV 102 is fully charged.

In one embodiment, if at the determined time the charging module 308 determines that the current total electric energy consumption of the sector where the EV 102 is located is above a threshold (e.g., more than 90% of the sector's maximum electric energy consumption), the charging module 308 delays charging for a set amount of time. In another amount, the charging module 308 delays charging until the consumption is below the threshold.

Figure 7:
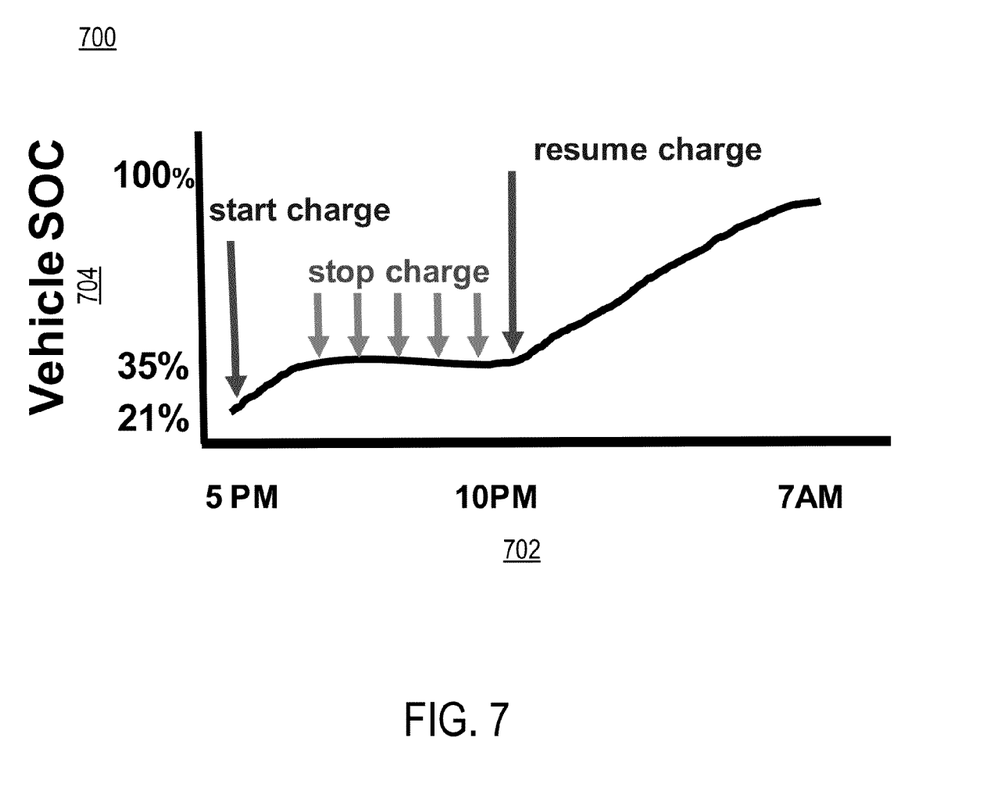
FIG. 7 is a graph that illustrates the charging of an electric vehicle according to one embodiment.

FIG. 7 is a graph 700 that illustrates the charging strategy executed by the charging module 308 when economical mode is selected for charging. The x-axis 702 shows different hours of a day. The y-axis 704 shows the state of charge of the EV 102 at the different times. Assume for purposes of this example that the EV 102 is parked at home at 5 PM and connected to a charging station. Additionally, assume that the minimum state of charge is set to 35%, that electric energy is economical from 12 AM to 10 AM and 10 PM to 11:59 PM, and all other times are peak hours. When the EV 102 arrives home at 5 PM, the state of charge of the EV 102 is 21%. The charging module at 5 PM starts the charging of the EV 102 even though it is peak hours. The charging module 308 allows the EV to charge until the state of charge of the EV 102 is 35% (i.e., the minimum state of charge). At that point the charging module 308 stops the charging. The charging module 308 resumes the charging once electric energy is economical which is at 10 PM. The charging continues until the EV is fully charged at 7 AM.

If green mode was selected, the strategy determined by the charging module 308 for charging the EV 102 includes the charging module 308 determining whether the current state of charge of the EV 102 is less than a minimum state of charge. If the current state of charge is below the minimum state of charge, the charging module 308 initiates the charging of the EV 102 regardless of whether the electric energy being supplied to the charging station by a utility company was generated using a non-renewable energy (e.g., using fossil fuels). The charging module 308 halts the charging of the EV 102 once the state of charge of the EV 102 reaches the minimum state of charge.

The charging module 308 identifies information provided by utility server 114 describing times when electric energy supplied to the charging station is generated using a renewable energy source. The charging module 308 determines the next time when energy is generated using a renewable energy source. At the determined time, the charging module 308 reinitiates the charging of the EV 102. The charging module 308 allows the EV 102 to continue charging as long as the electric energy is generated using a renewable energy source. In one embodiment, if at the determined time the charging module 308 determines that the current total electric energy consumption of the sector where the EV 102 is located is above a threshold, the charging module 308 delays charging as described above with regard to economic mode.

In one embodiment, if the charging module 308 receives charging instructions from the tracking server 112, instead of charging according to the strategy determined by the charging module 308, the charging module 308 charges the EV 102 according to the instructions received from the tracking server 112. In other words, the instructions received from the tracking server 112 override the strategy determined by the charging module 308 for charging the EV 102.

The notification module 310 transmits messages to a user of the EV 102. In one embodiment, when the charging module 308 receives instructions for charging the EV 102 from the tracking server 112, the notification module 310 sends a message with information as to how the EV 102 will be charged according to the instructions. For example, if instructions received from the tracking server 112 indicate to delay charging for two hours, the notification module 310 sends a message to the user that states that charging of the EV 102 will be delayed by two hours. Based on information received from the tracking server 112, the notification module 310 additionally includes in the message an explanation of why the EV 102 is being charged according to instructions from the tracking server 112. For example, the explanation may be that the current electric energy consumption of the EV's sector is close to causing a black out. In one embodiment, the notification module 310 transmits messages to the user when one or more of the following occurs: when the charging module 308 initiates the charging of the EV 102, when charging of the EV is stopped, and when the EV 102 has reached full charge.

In one embodiment, messages are transmitted by the notification module 310 to the user's mobile device as short message service (SMS) messages or multimedia messaging service (MMS) messages. In one embodiment, messages are transmitted by notification module 310 to the user's mobile device and appear on the mobile device as part of a mobile application that provides information about the EV 102. In another embodiment, messages are transmitted to the user's email address as emails.

Figure 4:
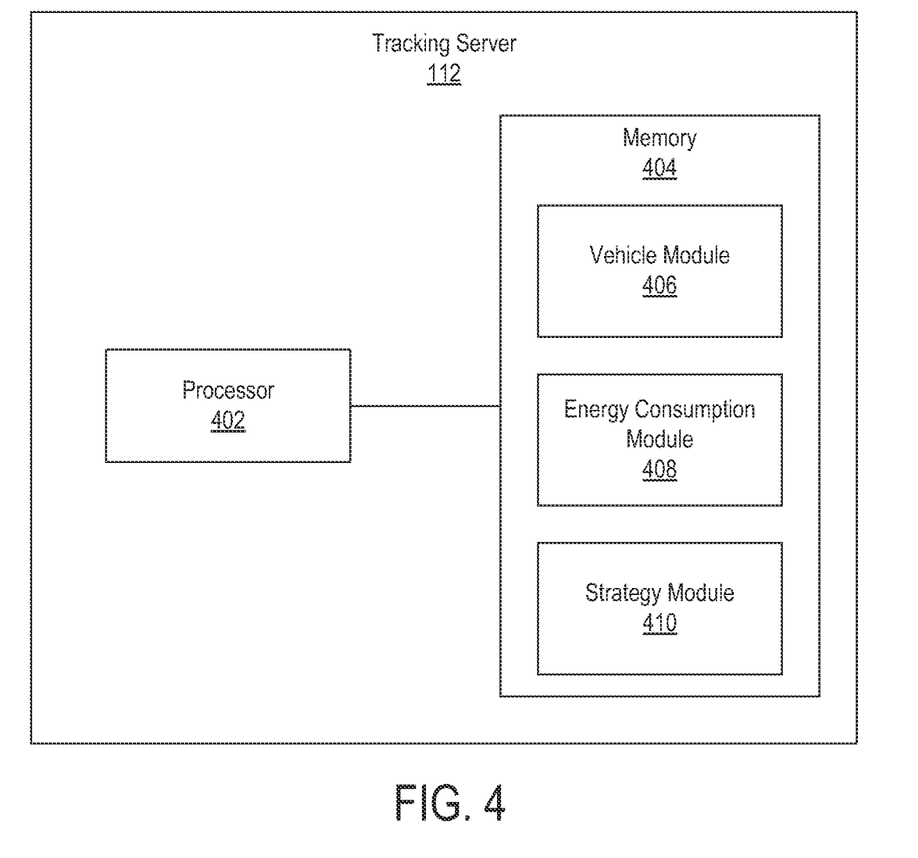
FIG. 4 is a high-level block diagram illustrating a detailed view of a tracking server according to one embodiment.

FIG. 4 is a high-level block diagram illustrating a detailed view of the tracking server 112 according to one embodiment. The tracker server 114 includes a processor 402 and a memory 404. In one embodiment, the processor 402 and memory 404 are functionally equivalent to the processor 202 and memory 212 of the telematics-navigation device 106. The memory 304 includes a vehicle module 406, an energy consumption module 408, and a strategy module 410.

The vehicle module 406 tracks EVs charging in different sectors. The vehicle module 406 maintains a list of EVs charging in each sector. When an EV transmits charging information that indicates that the EV is charging, the vehicle module 406 identifies from the charging information a current geographical location of the EV and a sector associated with the EV's geographical location. The vehicle module 406 determines whether the EV is included in the list. If the EV is not included, the vehicle module 406 adds the EV to the list (e.g., the VIN of the EV) under the identified sector along with charging information received. If the EV is already included in the list, the vehicle module 406 updates charging information included in the list for the EV based on the last information received. For example, if the current state of charge of the EV is 70% and the list indicates that it is 30%, the vehicle module 406 will update the list to indicate that it is 70%.

When an EV transmits charging information that indicates that the charging of the EV has stopped, the vehicle module 406 identifies the sector associated with the EV's current location. The vehicle module 406 removes the EV under the identified sector from the list.

The energy consumption module 408 tracks electric energy consumption for sectors. For each sector, the energy consumption module 408 periodically requests and receives (e.g., every 30 minutes) from the utility server 114 the current total electric energy consumption of the sector. The energy consumption module 408 tracks the current electric energy consumption of each of the sectors based on the information received from utility server 114.

The strategy module 410 when necessary controls the charging of EVs to reduce electric energy consumption of sectors. When the total electric energy consumption of a sector, as tracked by the energy consumption module 408, is greater than a threshold, the strategy module 410 obtains from the vehicle module 406 information on EVs charging in the sector. The strategy module 410 determines a strategy for efficiently charging the EVs in the sector in a way that will reduce the electric energy consumption of the sector.

In one embodiment, the strategy determined by the strategy module 410 is to reduce the rate at which electric energy is being transmitted to one or more of the EVs in the sector by their respective charging stations. In one embodiment, the strategy is to stagger the charging of the EVs in the sector so that not all the EVs continue to charge at the same time. Under this embodiment, the strategy consists of the strategy module 410 determining a schedule for each EV in the sector that is charging. The schedule indicates when the EV is to charge and for how long. In one embodiment, the EVs with lower current states of charge get the earlier charging times and are allowed to charge for longer periods, whereas the EVs that are more fully charged get the later times. In one embodiment, a strategy determined by the strategy module 410 that is more drastic is to stop the charging of all the EVs in the sector.

The strategy module 410 transmits instructions for charging to the appropriate EVs in the sector based on the determined strategy. The instructions describe to an EV how the EV should be charged. The transmitted instructions allow the EVs to execute the strategy determined by the strategy module 410. In one embodiment, the strategy module 410 transmits with the instructions information as to why the strategy is being put into effect (e.g., because current electric energy consumption is at 90% of maximum capacity).

In one embodiment, the threshold for each sector varies. For example, for one sector the threshold may be 90% of the sector's maximum electric energy capacity and in another sector the threshold may be 80% of the sector's maximum capacity. In one embodiment, there may be multiple thresholds for each sector and the strategy determined by the strategy module 410 depends on which threshold is surpassed. For example, if the threshold surpassed is 80% of a sectors maximum capacity, the strategy module 410 staggers the charging of the EVs in the sector. However, if the threshold surpassed is 95%, the strategy module 410 stops the charging of all EVs in the sector. In one embodiment, the one or more thresholds of a sector are set by a utility company that provides electric energy to the sector.

Figure 5:
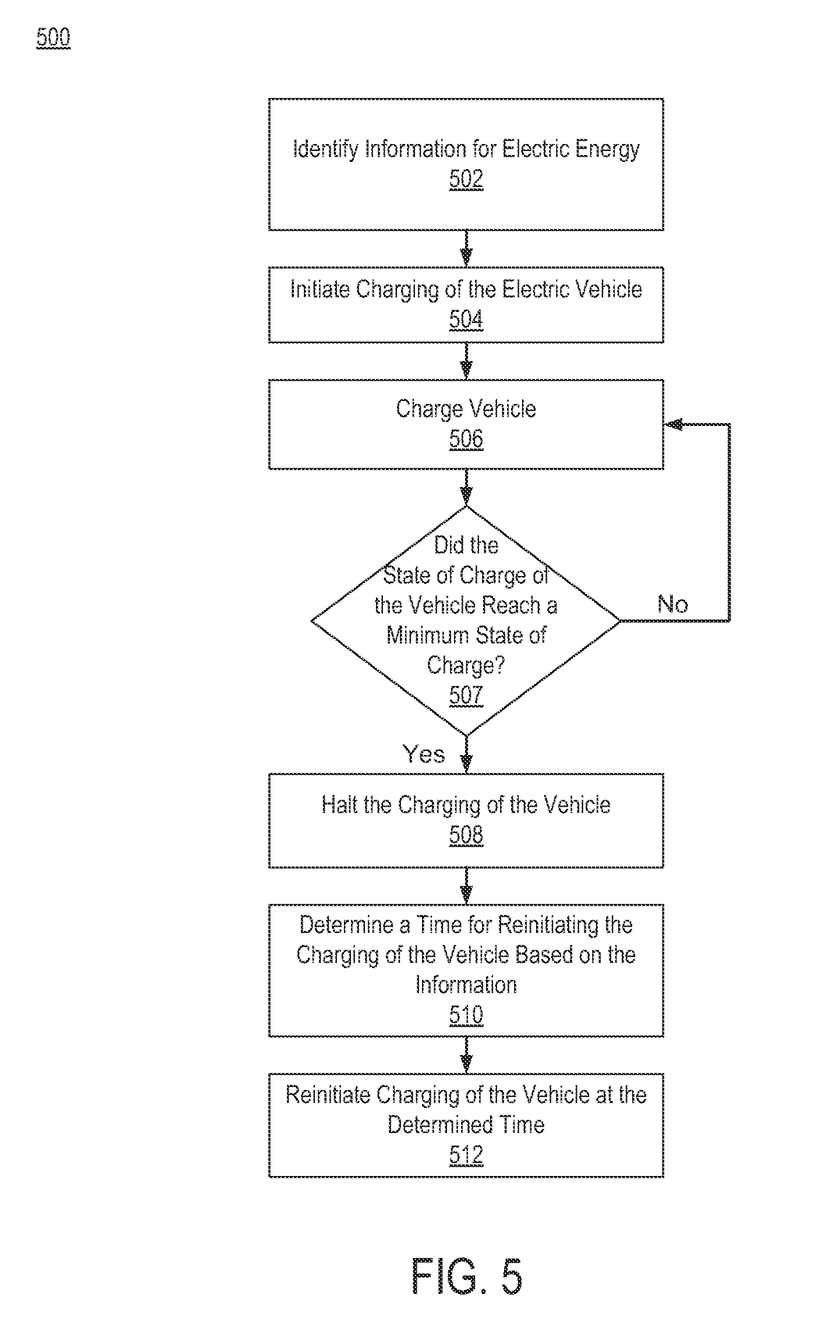
FIG. 5 is a flow chart of a method performed by a charging system for charging an electric vehicle according to one embodiment.

FIG. 5 is a flow chart 500 of a method performed by the charging system 104 for charging the EV 102 according to one embodiment. In one embodiment, the steps of the method are implemented by the processors of the telematics-navigation device 106 and the control unit 108 executing instructions that cause the desired actions. Those of skill in the art will recognize that one or more of the method steps may be implemented in embodiments of hardware and/or software or combinations thereof. For example, instructions for performing the described actions are embodied or stored within a non-transitory computer readable medium. Furthermore, those of skill in the art will recognize that other embodiments can perform the steps of FIG. 5 in different orders. Moreover, other embodiments can include different and/or additional steps than the ones described here.

Assume for purposes of this example that the EV 102 is connected to a charging station. The charging system 104 identifies 502 information for electric energy supplied to the charging station. The information is provided to the charging system 104 by the utility server 114. The charging system 104 initiates 504 charging of the EV 102 regardless of the current cost of the electric energy.

The charging system 104 allows 507 the EV 102 to continue charging 506 until the state of charge of the EV 102 reaches a minimum state of charge. The charging system 104 halts 508 the charging of the EV 102 once the state of charge of the EV 102 reaches the minimum state of charge. The charging system 104 determines 510 a time for reinitiating charging of the EV 102 based on the information. The charging system 104 reinitiates 512 charging of the EV 102 at the determined time.

If a user selected to charge the EV 102 under economic mode, the information identified is information that describes the cost of electric energy at different times of a day. Under economic mode, the time when charging is reinitiated is a time when electric energy is economical. However, if a user selected to charge the EV 102 under green mode, the information identified is information that describes times of a day when electric energy is generated using a renewable energy source. Under economic mode, the time when charging is reinitiated is the next time when electric energy is generated using a renewable energy source.

Figure 6:
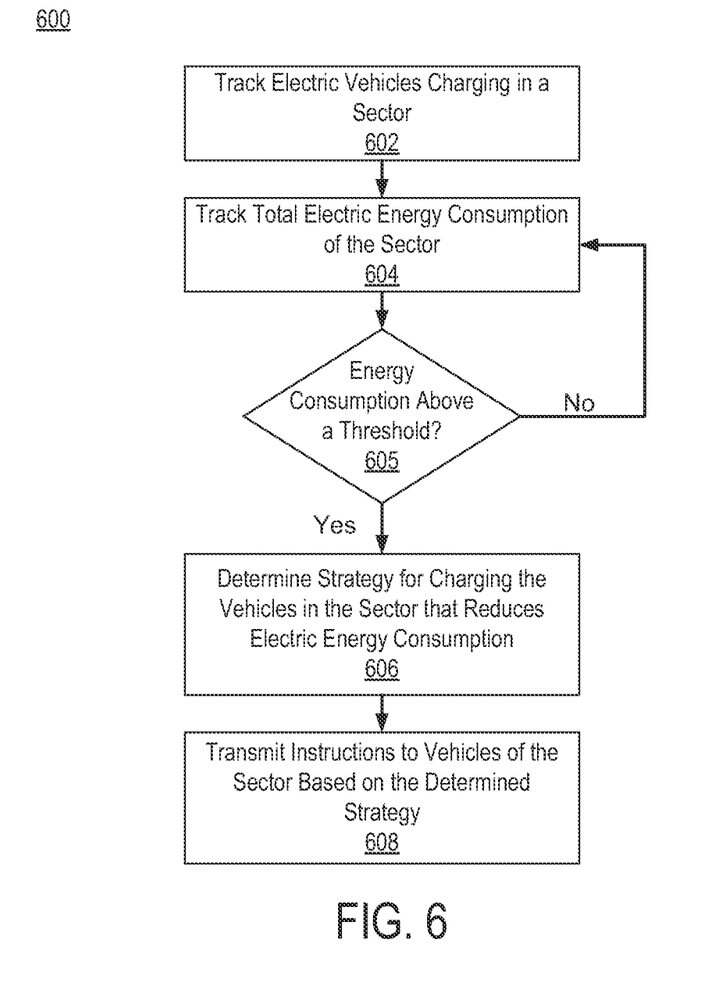
FIG. 6 is a flow chart of a method performed by the tracking server for reducing electric energy consumption in a sector according to one embodiment.

FIG. 6 is a flow chart 600 of a method performed by the tracking server 112 for reducing electric energy consumption in a sector according to one embodiment. In one embodiment, the steps of the method are implemented by the processor 402 of the tracking server 112 executing instructions that cause the desired actions. Those of skill in the art will recognize that one or more of the method steps may be implemented in embodiments of hardware and/or software or combinations thereof. For example, instructions for performing the described actions are embodied or stored within a non-transitory computer readable medium. Furthermore, those of skill in the art will recognize that other embodiments can perform the steps of FIG. 6 in different orders. Moreover, other embodiments can include different and/or additional steps than the ones described here.

The tracking server 112 tracks 602 EVs charging in a sector. The tracking server 112 additionally tracks 604 the total electric energy consumption of the sector. If the total electric energy consumption of the sector at any point is above a threshold 605, the tracking server 112 determines 606 a strategy for charging the EVs in the sector being tracked. The purpose of the strategy is to reduce electric energy consumption of the sector. The tracking server 112 transmits 608 instructions to one or more of the EVs based on the determined strategy. An EV receiving the instructions charges according to the instructions.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments present disclosure without departing from the spirit and scope of the disclosure.

The invention claimed is:

1. A computer-implemented method for charging an electric vehicle connected to a charging station, the method comprising:
responsive to a current start of charge of the vehicle being below a minimum state of charge, initiating charging of the vehicle regardless of a current cost for electric energy, the charging including the charging station providing the electric energy to the vehicle, the minimum state of charge less than a full charge capacity of the vehicle;
halting the charging of the vehicle responsive to the current state of charge of the vehicle reaching the minimum state of charge;
responsive to halting the charging of the vehicle based on the current state of charge reaching the minimum state of charge, determining a time for reinitiating the charging of the vehicle when cost of electric energy is below a set cost; and
reinitiating the charging of the vehicle at the determined time.

2. The method of claim 1, wherein information is received indicating cost of electric energy provided by the charging station and the time for reinitiating the charging is determined based on the received information.

3. The method of claim 1, wherein information is received indicating electric energy rates of electric energy provided by the charging station, where the electric energy rates vary based on at least one or more of the following: time, day, month, and calendar season.

4. The method of claim 1, wherein electric energy is below the set cost during off-peak hours.

5. The method of claim 1, wherein a user of the vehicle provides the set cost.

6. The method of claim 1, wherein the minimum state of charge is set by a user of the vehicle.

7. The method of claim 1, wherein the minimum state of charge is preset by a manufacturer of the vehicle.

* * * * *